United States Patent
Gumpoltsberger

(10) Patent No.: US 7,201,698 B2
(45) Date of Patent: Apr. 10, 2007

(54) MULTI-STAGE TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 178 days.

(21) Appl. No.: 10/520,547

(22) PCT Filed: Jul. 5, 2003

(86) PCT No.: PCT/EP03/07214

§ 371 (c)(1),
(2), (4) Date: Jan. 6, 2005

(87) PCT Pub. No.: WO2004/007994

PCT Pub. Date: Jan. 22, 2004

(65) Prior Publication Data
US 2006/0068965 A1 Mar. 30, 2006

(30) Foreign Application Priority Data
Jul. 11, 2002 (DE) .............................. 102 31 350

(51) Int. Cl.
*F16H 3/62* (2006.01)
(52) U.S. Cl. ..................................................... 475/276
(58) Field of Classification Search ................ 475/275, 475/276
See application file for complete search history.

(56) References Cited

U.S. PATENT DOCUMENTS

| | | | |
|---|---|---|---|
| 5,106,352 A | 4/1992 | Lepelletier | |
| 6,139,463 A | 10/2000 | Kasuya et al. | |
| 6,425,841 B1 | 7/2002 | Haka | |
| 6,572,507 B1 | 6/2003 | Korkmaz et al. | |
| 6,634,980 B1 | 10/2003 | Ziemer | |
| 2003/0083174 A1 | 5/2003 | Tabata et al. | |
| 2005/0209043 A1* | 9/2005 | Gumpoltsberger | 475/275 |
| 2005/0239593 A1* | 10/2005 | Gumpoltsberger | 475/275 |
| 2005/0255958 A1* | 11/2005 | Tiesler et al. | 475/275 |

FOREIGN PATENT DOCUMENTS

| | | |
|---|---|---|
| DE | 199 12 480 A1 | 9/2000 |
| DE | 199 49 507 A1 | 4/2001 |
| EP | 0 434 525 A1 | 6/1991 |

* cited by examiner

Primary Examiner—Dirk Wright
(74) Attorney, Agent, or Firm—Davis & Bujold, P.L.L.C.

(57) ABSTRACT

A multi-stage transmission comprises one input shaft (1) and one output shaft (2), three single-web planetary gear sets, seven rotatable shafts, six shifting elements, the selective engagement implements eight forward gears and two reverse gears, the input results by shaft (1) connected with the web of the first planetary gear set, the output results via shaft (2) connected with the ring gear of the second planetary gear set and the ring gear of the third planetary gear set, one shaft (3) is connected with the sun gear of the first planetary gear set, one shaft (4) is connected with the web of the second planetary gear set and the web of the third planetary gear set, one shaft (5) is connected with the ring gear of the first planetary gear set, one shaft (6) is connected with the sun gear of the second planetary gear set, one shaft (7) is connected with the sun gear of the third planetary gear set.

22 Claims, 3 Drawing Sheets

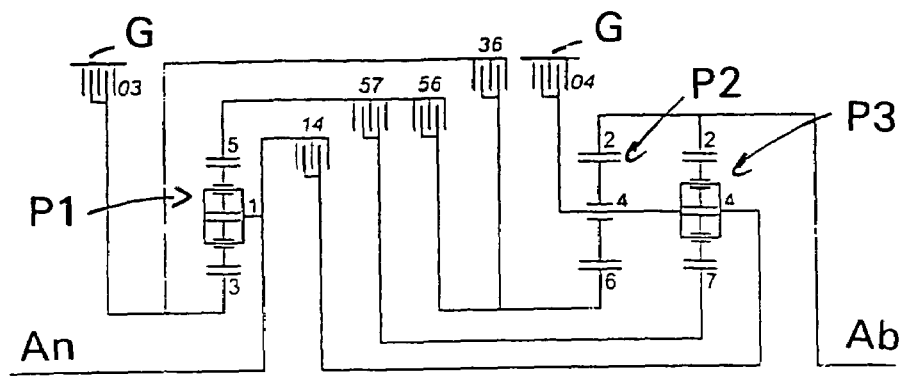
Fig. 1
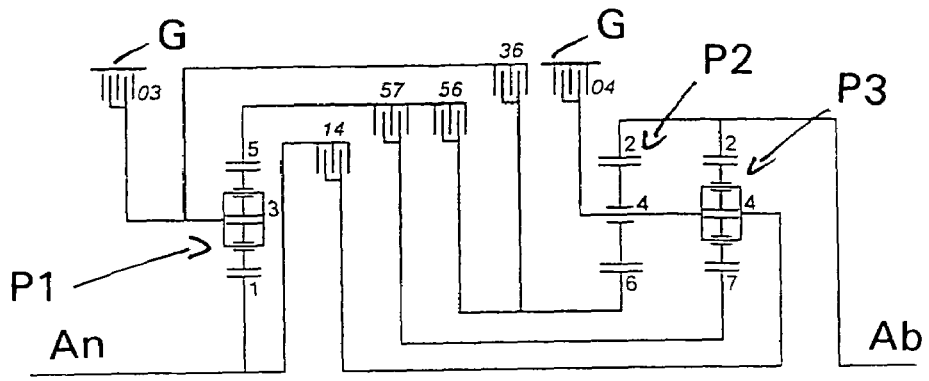
Fig. 2
| Gear: | 03 | 04 | 14 | 36 | 56 | 57 | i | φ |
|---|---|---|---|---|---|---|---|---|
| 1 | | | | • | | • | 5.66 | 1.53 |
| 2 | • | • | | | | • | 3.70 | 1.57 |
| 3 | • | • | | • | | • | 2.36 | 1.31 |
| 4 | • | • | | | • | • | 1.81 | 1.41 |
| 5 | • | | | | | • | 1.28 | 1.28 |
| 6 | | | • | | • | • | 1.00 | 1.18 |
| 7 | • | | • | | | • | 0.84 | 1.19 |
| 8 | • | | • | • | | | 0.71 | 0.77 |
| R1 | • | • | • | | • | | -4.38 | 0.43 |
| R2 | | • | | • | • | | -2.42 | 7.99 |
Fig. 3

MULTI-STAGE TRANSMISSION

This application is a national stage completion of PCT/EP2003/007214 filed Jul. 5, 2003 which claims priority from German Application Serial No. 102 31 350.4 filed Jul. 11, 2002.

FIELD OF THE INVENTION

This invention relates to a multi-stage transmission in planetary design, particularly an automatic transmission for a motor vehicle.

BACKGROUND OF THE INVENTION

The prior art for automatic transmissions, particularly for motor vehicles, comprise planetary gear sets switched by means of friction and shifting elements, such as clutches and brakes and are usually connected with a starting element subject to slip action, like a hydrodynamic torque converter or a fluid clutch, and are optionally provided with a lock-up clutch.

A transmission of that kind results form EP 0 434 525 A1. It essentially comprises one input shaft and one output shaft disposed in parallel, one double planetary gear set situated concentrically with the output shaft and five shifting elements in the form of three clutches and two brakes; the optional locking of which in pairs determines the different gear ratios between the input shaft and the output shaft. The transmission has one front-mounted gear set and two power paths so that by selective engagement in pairs of the five shifting elements six forward gears are obtained.

Two clutches are used in the first power path for transmitting the torque from front-mounted gear set to two elements of the double planetary gear set. These are disposed in power flow direction essentially behind the front-mounted gear set in the direction of the double planetary gear set. In the second power path, another clutch is provided which detachably connects it with another element of the double planetary gear set. The clutches are here disposed so that the internal disc carrier forms the output.

From the published U.S. Pat. No. 6,139,463, a multi-stage transmission in planetary design is also known, especially for motor vehicles, which has two planetary gear sets and one front-mounted gear set and three clutches and two brakes. In this known multi-stage transmission, two clutches C-1 and C-3 are provided in a first power path for transmitting the torque from the front-mounted gear set to the two planetary gear sets. The external disc carrier or the cylinder or piston and pressure compensation side of the clutch C-3 is connected with one first brake B-1. Besides, the internal disc carrier of the third clutch C-3 is connected with the cylinder or piston and pressure compensation side of the first clutch C-1, the internal disc carrier of the first clutch C-1 being situated on the output side and connected with a sun gear of the third planetary gear set.

The Applicant's DE 199 49 507 A1, in addition, discloses a multi-stage transmission where two non-switchable, front-mounted gear sets are provided on input shaft which produce two rotational speeds on the output side, and together with the rotational speed of the input shaft can optionally be switched by selective closing of the shifting elements used to a switchable double planetary gear set acting upon the output shaft in a manner such that for changing from one gear to the respective next following higher or lower gear of the two precisely actuated shifting elements, only one shifting element has to be engaged or disengaged.

DE 199 12 480 A1 further discloses an automatically switchable motor vehicle transmission having three single-web planetary gear sets, the same as three brakes and two clutches, for switching six forward gears and one reverse gear and having one input shaft, the same as one output shaft. The automatically switchable motor vehicle transmission is designed so that the input shaft is directly connected with the sun gear of the second planetary gear set and that the input shaft can be connected via the first clutch with the sun gear of the first planetary gear set and/or via the second clutch with the web of the first planetary gear set. Additionally or alternatively, the sun gear of the first planetary gear set can be connected via the first brake with the housing and/or the sun gear of the third planetary gear set via the third brake with the housing.

The problem on which this invention is based is to produce a multi-stage transmission of the above mentioned kind in which the construction cost is optimized and, in addition, the efficiency degree in the main drive gears is improved with regard to towing and gearing losses. Besides, in the inventive multi-stage transmission light torques are to act upon the shifting elements and planetary gear sets and the rotational speeds of the shafts, shifting elements and planetary gear sets are to be kept as low as possible. In addition, the number of gears and the thrust of the transmission are increased.

SUMMARY OF THE INVENTION

An inventive multi-stage transmission is accordingly proposed which has one input shaft and one output shaft located in one housing. Moreover, at least three single-web planetary gear sets, at least seven rotatable shafts and at least six shifting elements, including brakes and clutches, are provided whose selective engagement produces different reduction ratios between the input shaft and the output shaft so that chiefly eight forward gears and two reverse gears can be implemented.

According to this invention in the multi-stage transmission, it is provided that the input results by one shaft permanently connected with one element of the first planetary gear set and that the output results via one shaft connected with the ring gear of the second planetary gear set and the ring gear of the third planetary gear set. It is further provided in the inventive multi-stage transmission that a third shaft be permanently connected with another element of the first planetary gear set; that a fourth shaft be permanently connected with the web of the second planetary gear set and the web of the third planetary gear set; that a fifth shaft be permanently connected with the ring gear of the first planetary gear set; that a sixth shaft be permanently connected with the sun gear of the second planetary gear set and that one other seventh shaft be connected with the sun gear of the third planetary gear set; the planetary gear sets being coupled with shafts and shifting elements.

Within the scope of a preferred embodiment, the input shaft is connected with the sun gear of the first planetary gear set and the third shaft with the web thereof one other embodiment providing an exchange of said connections so that the input shaft be connected with the web of the first planetary gear set and the third shaft with the sun gear of the first planetary gear set.

According to the invention, the first and the third planetary gear sets are designed as plus planetary gear sets; the second planetary gear set as minus planetary gear set.

By the inventive configuration of the multi-stage transmission, adequate ratios result, the same as a considerable increase of the total thrust of the multi-stage transmission whereby an improvement in driving comfort and a significant reduction of consumption are produced.

The inventive multi-stage transmission is suited to every motor vehicle, especially passenger motor vehicles, and for commercial motor vehicles, such as trucks, autobuses, construction vehicles, rail vehicles, caterpillar vehicles and the like.

With the inventive multi-stage transmission, the small number of shifting elements, preferably four clutches and two brakes, reduce the construction cost. It is advantageously possible with the inventive multi-stage transmission to start off with a hydrodynamic converter, an external starting clutch or any other adequate external starting element. It is also conceivable to make a starting operation with a starting element integrated in the transmission possible. Preferably suitable is a shifting element actuated in the first gear and in the reverse gear.

In the inventive multi-stage transmission, there additionally results a good efficiency degree in the main drive gears relative to towing and gearing losses.

In addition, light torques abut in the shifting elements and in the planetary gear sets of the multi-stage transmission whereby wear is advantageously reduced in the multi-stage transmission. Furthermore, due to the light torques, a correspondingly small dimension is possible whereby the needed installation space and attendant costs are reduced. Besides, the rotational speeds in the shafts, the shifting elements and the planetary gear sets are also low.

The inventive transmission is also produced so that an adaptability to different drive line shapes is made possible both in power flow direction and with regard to space.

BRIEF DESCRIPTION OF THE DRAWINGS

The invention will now be described, by way of example, with reference to the accompanyings drawings in which:

FIG. 1 is a diagrammatic view of a preferred embodiment of an inventive multi-stage transmission;

FIG. 2 is a diagrammatic view of another preferred embodiment of an inventive multi-stage transmission;

FIG. 3 is a circuit diagram for the inventive multi-stage transmission according to FIG. 1 and FIG. 2;

DETAILED DESCRIPTION OF THE INVENTION

Figure 4:
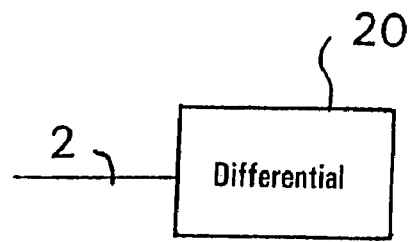
FIG. 4 is a diagrammatic view of an embodiment of the multi-stage transmission having a differential.

In FIG. 1 is shown the inventive multi-stage transmission with one input shaft 1 (An) and one output shaft 2 (Ab) located in one housing G. Three single-web planetary gear sets P1, P2, P3 are provided. The first planetary gear set P1 and the third planetary gear set P3 are here designed as plus planetary gear sets; the second planetary gear set P2 is designed as minus planetary gear set. It is also possible that the second planetary gear set P2 and the third planetary gear set P3 are combined as Ravigneaux planetary gear sets with one common web and one common ring gear.

As can be seen from FIGS. 1 and 2, only six shifting elements, namely, two brakes 03, 04 and four clutches 14, 36, 56 and 57, are provided.

With the shifting elements can be implemented eight forward gears and two reverse gears. The inventive multi-stage transmission has altogether seven rotatable shafts, namely, the shafts 1, 2, 3, 4, 5, 6 and 7.

According to the invention, in the multi-stage transmission of FIG. 1 is provided that the input results by the shaft 1 permanently connected with the web of the first planetary gear set P1. The output results via the shaft 2 permanently connected with the ring gear of the second planetary gear set P2 and the ring gear of the third planetary gear set P3. Moreover, the shaft 3 is permanently connected with the sun gear of the first planetary gear set P1 and the shaft 4 is permanently connected with the web of the second planetary gear set P2 and the web of the third planetary gear set P3. In addition, the shaft 5 is permanently connected with the ring gear of the first planetary gear set P1. The other rotatable shaft 6 is inventively permanently connected with the sun gear of the second planetary gear set P2 and the shaft 7 with the sun gear of the third planetary gear set P3.

In the inventive multi-stage transmission, the shaft 3 by the brake 03 and the shaft 4 by the brake 04 are attachable to the housing G. The clutch 14 detachably interconnects the shaft 1 and the shaft 4; the shaft 3 and the shaft 6 are detachably interconnected via the clutch 36. In addition, the shafts 5 and 6 and the shafts 5 and 7 are detachably interconnected respectively by the clutches 56 and 57.

In FIG. 2 is shown one other embodiment of the inventive multi-stage transmission. The difference from the embodiment according to FIG. 1 is that the input shaft is connected with the sun gear of the first planetary gear set P1 and that the shaft 3 is connected with the web of the first planetary gear set P1.

In FIG. 3 is shown a circuit diagram of the inventive multi-stage transmission according to FIGS. 1 and 2. From the circuit diagram can be deduced, by way of example, the respective ratios i of the individual gear steps and the ratio ranges φ to be determined therefrom. It can further be inferred from the circuit diagram that in sequential switching mode double gear shifts are prevented since two adjacent gear steps respectively use two shifting elements in common.

The clutch 57 is always closed for the first seven forward gears. In addition, the brake 04 and the clutch 36 for the first gear are activated; the brakes 03 and 04 for the second gear; the brake 03 and the clutch 36 for the third gear; the brake 03 and the clutch 56 for the fourth gear; the brake 03 and the clutch 14 for the fifth gear; the clutches 14 and 56 for the sixth gear and the brake 03 and the clutch 14 for the seventh gear. For the eighth gear the brake 03 and the clutches 14 and 36 are closed. The first reverse gear R1 requires the shifting elements 03, 04 and 56; for the second reverse gear R2 the shifting elements 04, 36 and 56 are activated.

Figure 10:
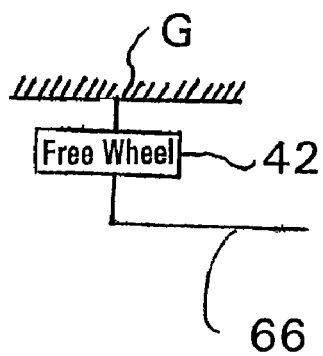
FIG. 10 is a diagrammatic view of the multi-stage transmission having a free wheel.

According to the invention, as shown in FIG. 10, it is possible to provide a free wheel(s) 42 on each adequate place of the multi-stage transmission, for example, between one shaft 66 and the housing G or, if that is the case, to connect two shafts.

Figure 13:
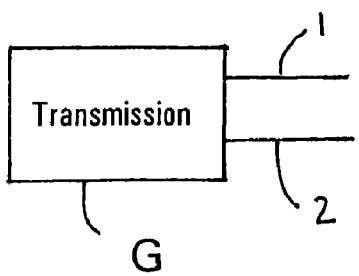
FIG. 13 is a diagrammatic view showing the input and the output on the same side of the transmission housing.

Furthermore, as shown in FIG. 13, the inventive design makes it possible to place on the same side of the transmission or of the housing G the input and the output (1, 2) for transverse, front-longitudinal, rear-longitudinal, or all-wheel systems. On the input side or on the output side can also be situated one axle differential 20 and/or one transfer differential, as shown in FIG. 4.

Figure 5:
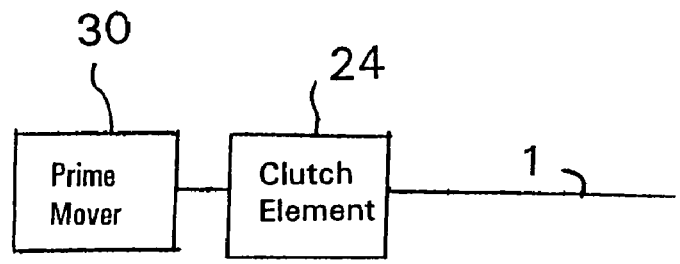
FIG. 5 is a diagrammatic view of the multi-stage transmission with a clutch and a prime mover.
Figure 6:
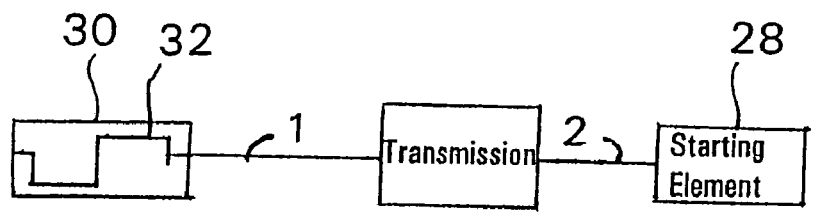
FIG. 6 is a diagrammatic view of the multi-stage transmission located between a starting element and a prime mover.
Figure 7:
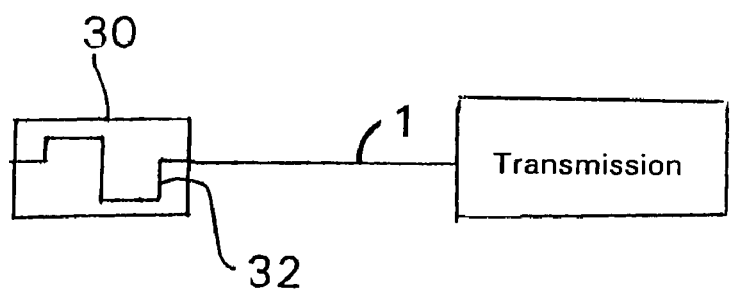
FIG. 7 is a diagrammatic view of the multi-stage transmission for a front-transverse installation with a prime mover.

Within the range of an advantageous development, as shown in FIG. 5, the input shaft 1 can be, as needed, separated by a clutch element 24 from the engine or prime mover 30; it is possible to use as the clutch element a hydrodynamic converter, a hydraulic clutch, a dry starting clutch, a wet starting clutch, a magnetic powder clutch or a centrifugal clutch. It is also possible, as shown in FIG.6, to situate such a starting element 28 in a power flow direction behind or downstream of the transmission in which case the input shaft 1 is permanently connected with the crankshaft 32 of the engine or the prime mover 30, as shown in FIG. 7. According to the invention, it is also possible to start off by way of one of the shifting elements of the transmission. The brake 04 is preferably used as the starting element which is activated both in the first forward gear and in the first reverse gear.

Figure 8:
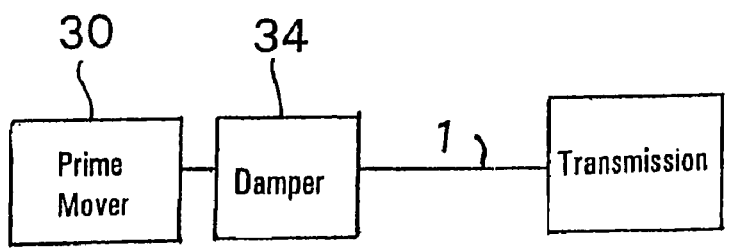
FIG. 8 is a diagrammatic view of the multi-stage transmission with a prime mover and a damper.

The inventive multi-stage transmission further makes situating a torsional vibration damper 34 between an engine or a prime mover 30 and the transmission possible, as shown in FIG. 8.

Figure 9:
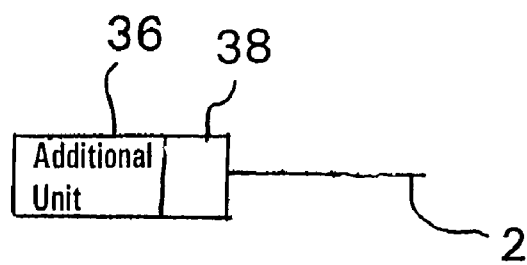
FIG. 9 is a diagrammatic view of the multi-stage transmission with a power take off for an additional unit.
Figure 12:
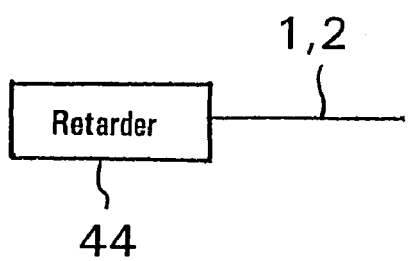
FIG. 12 is a diagrammatic view of one of the shafts having a retarder.

Within the scope of another embodiment of the invention, as shown in FIG. 12, it is possible upon each shaft, preferably upon the input shaft 1 or the output shaft 2, to place a wear-free brake such as a hydraulic or electric retarder 44 or the like, which is especially important for use in commercial motor vehicles. There can also be provided on each shaft, preferably on the input shaft 1 or the output shaft 2, a power take off unit 38 for driving an additional unit(s) 36, as shown in FIG. 9.

The shifting elements used can be designed as power shiftable clutches or brakes. Force-locking clutches or brakes can especially be used, such as multi-disc clutches, band brakes and/or tapered clutches. Force-locking brakes and/or clutches can also be used as the shifting elements, such as synchronizer units or dog clutches.

Figure 11:
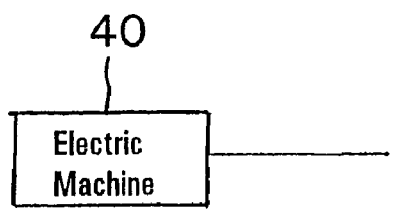
FIG. 11 is a diagrammatic view of the multi-stage transmission with an electric machine.

Another advantage of the multi-stage transmission here introduced, as shown in FIG. 11 is that upon each shaft an electric machine 40 can be mounted as a generator and/or as a added prime mover.

The functional features of the claims can be constructionally designed in the most diverse manners. For the sake of simplicity, these practical possible designs have not been explicitly described. But every constructional design of the invention, especially every spatial arrangement of the planetary gear sets and of the shifting elements, or relative to each other and insofar as technically significant, obviously fall under the scope of protection of the claims.

REFERENCE NUMERALS 1 shaft
2 shaft
3 shaft
4 shaft
5 shaft
6 shaft
7 shaft
03 brake
04 brake
14 clutch
36 clutch
56 clutch
57 clutch
P1 planetary gear set
P2 planetary gear set
P3 planetary gear set
An input
Ab output
i ratio
100 ratio range
G housing

The invention claimed is:

1. A multi-stage transmission of a planetary design for a motor vehicle, comprising an input shaft (1) and an output shaft (2) located in a housing (G), first, second and third single-web planetary gear sets (P1,P2, P3), at least third, fourth, fifth, six and seventh (3, 4, 5, 6, 7), at least six shifting elements (03, 04, 14, 36, 56, 57), including brakes and clutches whose selective engagement produces different reduction ratios between the input shaft (1) and the output shaft (2) so that eight forward gears and two reverse gears can be implemented, input results the input shaft (1) being permanently connected with a first element of the planetary gear set (P1) and output results via the output shaft (2) being permanently connected with a ring gear of the second planetary gear set (P2) and a ring gear of the third planetary gear set (P3), the third shaft (3) being permanently connected with another element of the first planetary gear set (P1), the fourth shaft (4) being permanently connected with a web of the second planetary gear set (P2) and a web of the third planetary gear set (P3), the fifth shaft (5) being permanently connected with a ring gear of the first planetary gear set (P1), the sixth shaft (6) being permanently connected with a sun gear of the second planetary gear set (P2), the seventh shaft (7) being permanently connected with a sun gear of the third planetary gear set (P3), the third shaft (3) being attachable to the housing (g) by a first brake (03), the fourth shaft (4) being attachable to the housing (G) by a second brake (04), a first clutch (14) detachably interconnects the input shaft (1) and the fourth shaft (4), a second clutch (36) detachably interconnects the third shaft (3) and the sixth shaft (6), a third clutch (56) detachably interconnects the fifth shaft (5) and the sixth shaft (6) and a fourth clutch (57) detachably interconnects the fifth shaft (5) and the seventh shaft (7).

2. The multi-stage transmission according to claim 1, the input shaft (1) is permanently connected with a sun gear of the first planetary gear set (P1) and the third shaft (3) is permanently connected with a web of the first planetary gear set (P1).

3. The multi-stage transmission according to claim 1, wherein the input shaft (1) is permanently connected with a web of the first planetary gear set (P1) and the third shaft (3) is permanently connected with a sun gear of the first planetary gear set (P1).

4. The multi-stage transmission according to claim 1, wherein the first planetary gear set (P1) and the third planetary gear set (P3) are plus planetary gear sets and the second planetary gear set (P2) is a minus planetary gear set.

5. The multi-stage transmission according to claim 1, wherein the second planetary gear set (P2) and the third planetary gear set (P3) are combined as a Ravigneaux planetary gear set with a common web and a common ring gear.

6. The multi-stage transmission according to claim 1, wherein the multi-stage transmission includes a free wheel.

7. The multi-stage transmission according to claim 6, wherein the free wheel is provided between at least one of the input, the output, the third, the fourth, the fifth, the sixth and the seventh shafts (1, 2) and the housing (G).

8. The multi-stage transmission according to claim 1, wherein the input and the output shafts (1, 2) are provided on a same side of the housing (G).

9. The multi-stage transmission according to claim 1, wherein at least one of an axle differential and a transfer differential is situated on an input side or on an output side of the multi-stage transmission.

10. The multi-stage transmission according to claim 1, wherein the input shaft (1) is separated from a prime mover by a clutch element.

11. The multi-stage transmission according to claim 10, wherein the clutch element is one of a hydrodynamic converter, a hydraulic clutch, a dry starting clutch, a wet starting clutch, a magnetic powder clutch and a centrifugal clutch.

12. The multi-stage transmission according to claim 1, wherein an external starting element is located in a power flow direction downstream of the multi-stage transmission, and the input shaft (1) is fixedly connected with a crankshaft of a prime mover.

13. The multi-stage transmission according to claim 1, wherein starting results by engagement of one of the at least six shifting elements (03, 04, 14, 36, 56, 57) of the multi-stage transmission, and the input shaft (1) is permanently connected with a crankshaft of a prime mover.

14. The multi-stage transmission according to claim 13, wherein the second brake (04) is used as the shifting element for starting the multi-stage transmission.

15. The multi-stage transmission according to claim 1, wherein a torsional vibration damper is situated between a prime mover and the multi-stage transmission.

16. The multi-stage transmission according to claim 1, wherein a wear-free brake is situated upon at least one of the input, the output, the third, the fourth, the fifth, the sixth and the seventh shafts.

17. The multi-stage transmission according to claim 1, wherein a power take-off is situated upon at least one of the input, the output, the third, the fourth, the fifth, the sixth and the seventh shafts for driving an additional unit.

18. The multi-stage transmission according to claim 17, wherein the power take-off is situated upon one of the input shaft (1) and the output shaft (2).

19. The multi-stage transmission according to claim 1, wherein the at least six shifting elements (03, 04, 14, 36, 56, 57) are one of power shiftable clutches and brakes.

20. The multi-stage transmission according to claim 19, wherein the at least six shifting elements (03, 04, 14, 36, 56, 57) are one of multi-disc clutches, band brakes and tapered clutches.

21. The multi-stage transmission according to claim 1, wherein the at least six shifting elements (03, 04, 14, 36, 56, 57) comprise one of force-locking brakes and clutches.

22. The multi-stage transmission according to claim 1, wherein an electric machine is mounted upon one of the input shaft, the output shaft, the third shaft, the fourth shaft, the fifth shaft, the sixth shaft and the seventh shaft (1, 2, 3, 4, 5, 6, 7) as one of a generator and an additional prime mover.

* * * * *